Jan. 8, 1952  W. A. BIERMANN ET AL  2,581,901
LIQUID LEVEL CONTROL DEVICE

Filed Sept. 11, 1946  2 SHEETS—SHEET 1

WILLIAM A. BIERMANN
JOHN T. DULAK
INVENTORS

BY John W. Michael
ATTORNEY

Jan. 8, 1952 W. A. BIERMANN ET AL 2,581,901
LIQUID LEVEL CONTROL DEVICE
Filed Sept. 11, 1946 2 SHEETS—SHEET 2
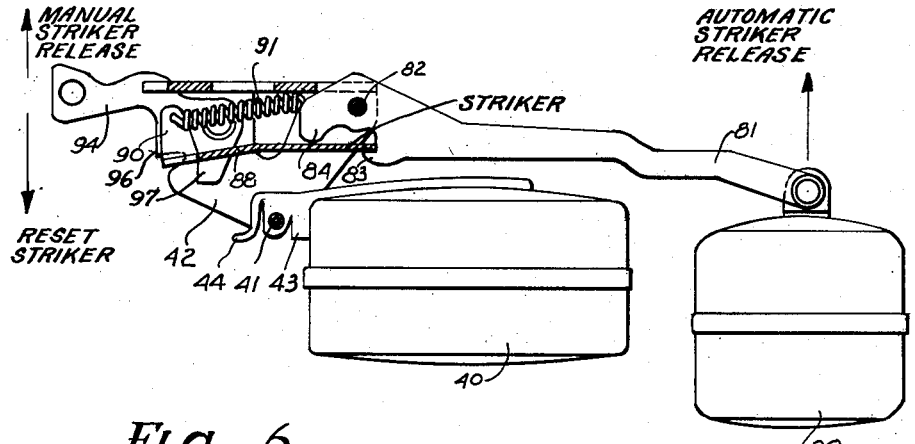
Fig. 6
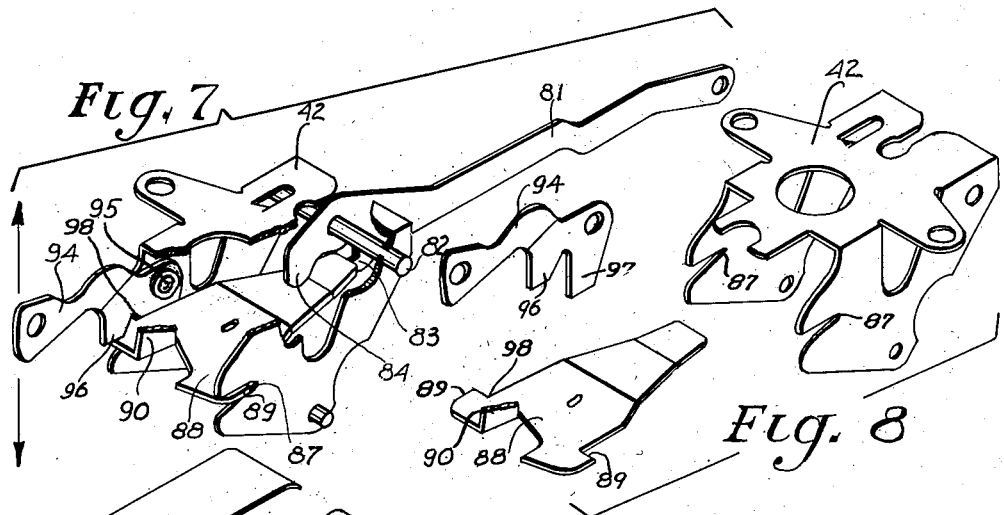
Fig. 7
Fig. 8
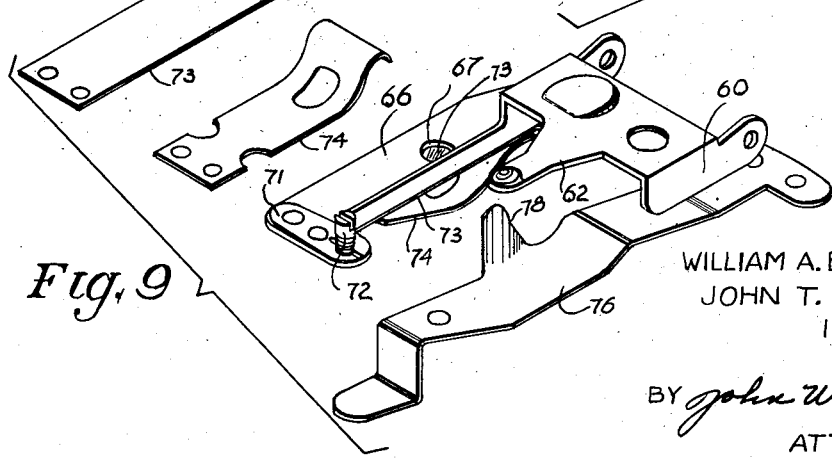
Fig. 9
WILLIAM A. BIERMANN
JOHN T. DULAK
INVENTORS
BY John W. Michael
ATTORNEY Patented Jan. 8, 1952

2,581,901

UNITED STATES PATENT OFFICE 2,581,901

LIQUID LEVEL CONTROL DEVICE

William A. Biermann and John T. Dulak, Milwaukee County, Wis., assignors to A P Controls Corporation, a corporation of Wisconsin Application September 11, 1946, Serial No. 696,282

11 Claims. (Cl. 137—68)

1

This invention relates to improvements in devices for controlling the flow of liquid to be kept under a constant hydraulic head and particularly to devices interposed between a reservoir of liquid fuel and a burner, and in which a constant level is to be maintained for gravity feed of fuel to the burner.

It is one object of the present invention to provide a more positive acting and a simpler and safer device of the constant level type, for control of the flow of liquid from a reservoir to a burner, than such devices as constructed heretofore.

Another object of the invention is to provide an inlet valve construction for positively positioning the valve relative to its seat and for assuring application of the valve closing force axially of the valve.

And another object of the present invention is to provide a control device of the constant level type for controlling the flow of liquid fuel from a reservoir to a burner which device is simpler and easier to manufacture and provides greater reliability and safety in operation than similar devices heretofore made.

Objects and advantages other than those set forth above, will be apparent by the following description when read in connection with the accompanying drawing in which:

Fig. 6 is a view partially in side elevation and partially in section of one sub-assembly of the present device;

Fig. 7 is an isometric projection of the sub-assembly shown in Fig. 6 with parts thereof broken away;

Fig. 8 is an exploded isometric view of some of the parts shown in Fig. 7, and

Fig. 9 is a partially exploded isometric projection of another sub-assembly of the present device.

Figure 1:
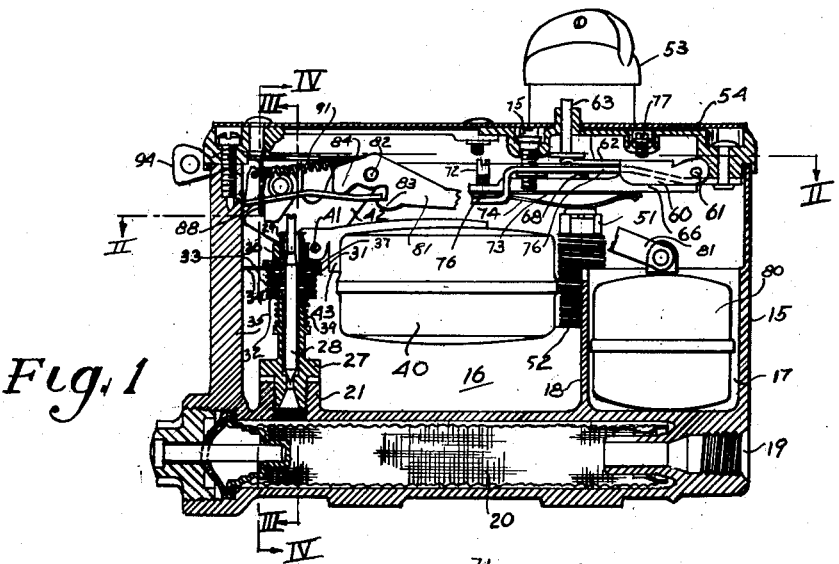
Fig. 1 is a vertical sectional view on substantially a central plane longitudinally of a liquid flow control device embodying the present invention.
Figure 2:
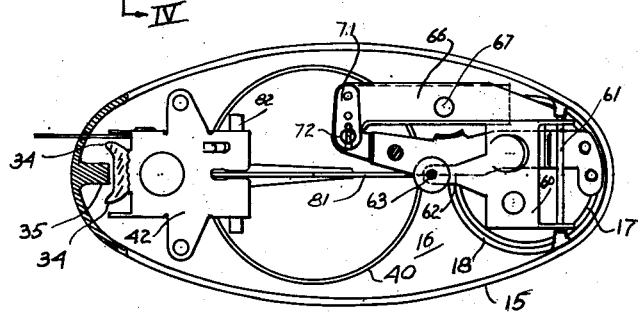
Fig. 2 is a section taken on a horizontal plane through broken line II—II of Fig. 1.
Figures 3, 4:
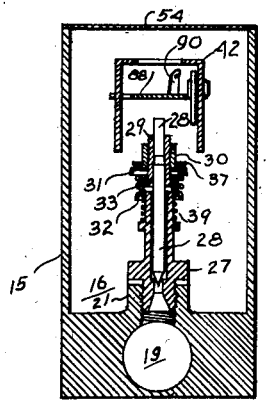
Fig. 3 is a vertical sectional view taken on the plane of line III—III of Fig. 1.
Fig. 4 is a vertical sectional view taken on the plane of line IV—IV of Fig. 1.

Generally, the present invention relates to liquid level flow control devices of the character disclosed in Patent 2,293,903, issued to R. W. Johnson on August 25, 1942, and comprises a casing which is to be connected between a reservoir of liquid fuel and a burner and which is provided with an inlet valve normally biased or urged toward an open position. The inlet valve is closed responsive to changes in liquid level in one chamber of the casing from which the liquid flow is under the control of an outlet valve. The inlet valve is provided with means to cause the valve closing force to be applied axially only of the valve thus making the valve more sensitive to such force and is provided with means preventing improper placement of the valve relative to its seat.

A leverage is provided to act between a movable control knob projecting externally of the casing and the outlet valve and includes a minimum number of parts for making the leverage action adjustable to set the "pilot fire" and the "high fire flame" limits of the burner as may be desired, and to provide for other adjustments that may be required in operation of the device. Such leverage has resilient portions which will cushion any blow on the knob and prevent damage to the leverage or the outlet valve controlled thereby.

Means are provided which are automatically released to forcibly close the inlet valve by impact thereon whenever the liquid level in the casing rises above the predetermined value. The automatic shut-off means may be manually reset when normal conditions have been re-established. The manual control may also be utilized to release the shut-off means to forcibly close the inlet valve.

Referring particularly to the drawings, reference numeral 15 designates a casing open at the top and substantially divided into a main chamber 16 and an auxiliary chamber 17 by a partial partition 18 forming a weir over which oil flows from the main chamber to the auxiliary chamber when the oil level in the casing exceeds a predetermined value. The casing has an inlet passage 19, formed in the wall thereof, to receive a removable strainer 20 which, together with the means holding the strainer in the inlet passage, is well known and requires no further description. An apertured casing boss 21 extends into the main chamber 16 and connects the inlet passage 19 with such chamber, the boss being internally threaded to receive a valve seat member or casing 27.

Flow of oil through such member is controlled by a needle valve 28, seating in and guided on its movements by the valve casing. A sleeve 29 is pressed on the stem portion of the valve and is threaded to receive a nut 30 bearing on a guide member 31. A spring cup 32 seats on the flange on sleeve 29 and an expansion spring 33 seats between the guide and the spring cup to co-act with the nut 30 in resiliently holding the nut, the guide and the spring cup in position. The guide member 31 may be formed with a bifurcated or forked end 34 which co-acts with a guideway shown as a rib 35 extending inwardly from the casing wall. Accidental rotation of valve 28 relative to its seat, is thus avoided after the valve has been formed to its seat thus preventing leakage due to change in positioning of the valve relative to its seat.

Figure 5:
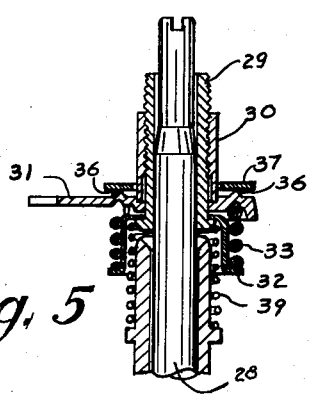
Fig. 5 is an enlarged view of a fragment of the structure shown in Fig. 1.

The guide 31 is formed with a square cavity therein to seat the square nut 30, thus fixing the relative positions of the valve 28 and the guide and is also formed (see Fig. 5) with bosses 36 projecting from the guide on a diameter of the valve when the guide is in seated position. Such bosses serve as substantially point bearings for a washer-like plate 37 having a square hole therein to fit over the nut 30. The washer has sufficient clearance about the nut 30 so that it can tilt on the bosses 36 to equalize pressure exerted on the valve by way of the washer and acting to close the valve. Such pressure is now prevented from acting at an angle to the axis of the valve and cannot cause binding of the valve in its seat member.

A spring 39 seats on a flange on the valve casing member 27 and in the spring cup 32 to bias or urge the inlet valve 28 toward an open or unseated position. The opening or unseating bias of spring 39 is resisted by the action, of a main float 40 movable about a pivot 41 in a bracket 42 fixed in the casing, and is responsive to liquid level changes in the main casing chamber 16. The pivot for the main float 40 passes through a lever arm 43 extending from the float and formed with arcuate ends 44 bearing on the pressure equalizing plate 37 and engaging two opposite sides of the nut 30. The bearing points of the lever ends 44 on the upper face of the plate 37 are substantially midway between the bearing points of the bosses 36 on the bottom face of the plate 37. Thus the plate 37 and the four bearing points constitute a form of universal connection between the float arm and the valve member. The float rises and falls with change in liquid level in the chamber 16 and, respectively, closes or allows the valve 28 to be opened by the spring 39. Rotation of the valve in its opening or closing movements is prevented by engagement of the ends of guide member projection 34 with the guideway rib 35 projecting inwardly from the wall of and in a substantially vertical direction in the casing portion defining the main chamber 16. Hence, means are provided for insuring that the inlet valve assembly is properly returned to its casing and seat member rather than turned relative thereto, after each removal of the valve therefrom for cleaning or other reasons.

During normal operation of the device, oil is admitted to the chamber 16 by way of the inlet valve 28 and flows therefrom by way of an outlet valve indicated at 51, which is also biased toward an open position by a spring 52. The position of the outlet valve is controlled by a leverage (to be hereinafter described) of which the position is determined by the setting of a control knob 53 extending outwardly from the cover 54 of the casing 15. The structure of the outlet valve itself and of the control knob are fully disclosed in the above identified patent and are not further described herein.

However, the control leverage of the present device is materially changed and simplified as compared to the leverage performing similar functions in the above patent. The present control leverage (see Fig. 9) comprises a lever 60 pivoted at 61 in the casing and formed with an arm 62 projecting from the lever on substantially the longitudinal axis of the casing to engage the end of a push pin 63, extending through the cover 54 for transmitting the action of any one of a number of known thermostatically controlled means for automatically controlling outlet valve 51. The lever 60 also has an arm 66 extending laterally and forwardly of the main portion of the lever and such arm is formed with a hole 67 to pass a valve operating stud 68 actuated by the knob 53. A lug 71 is fixed on the forward end of the lever arm 66 to receive a screw 72 and to provide an attachment member for leaf springs 73, 74, the spring 73 being positioned by the knob stud 68 and positioning spring 74 which acts on the outlet valve 51. An arm 76 of stiffly resilient material is fixed in the casing 15 and extends beneath the leverage lug 71 where the end of the screw 72 may bear on the arm to adjust the "pilot fire" position of the outlet valve. Such arm 76 is formed with a screw threaded aperture to receive a screw 75, rotatably supported in the cover 54, by which the pressure of the arm 76 on the screw 72 may be varied to adjust the position of an arm portion 78 serving as an abutment for the knob cam and thereby compensate for variations in oil viscosity. A screw 77 is threaded into the cover 54 to bear on the lever 60 for limiting the "high fire" position of the above leverage and of outlet valve. The use of two leaf springs provides the important advantages that a blow on the control knob is cushioned or taken up by the springs thus avoiding damage to the mechanism as a whole and to the above leverage and the outlet valve particularly.

Even though the oil passes through the strainer, and even though the movement of the inlet valve is guided and the float pressure is applied axially of the valve, it is possible for conditions to occur which cause the inlet valve to stick in an open position. Hence, means are provided for forcibly driving the inlet valve toward closed position after a time delay, dependent only on the degree of opening of the inlet valve. Such means include an auxiliary float 80 movable in the auxiliary chamber 17 in the casing 15. The float is pivotally mounted on a lever 81, which is pivoted at 82 in the bracket 42, the end of the lever adjacent the pivot having a jaw 83 formed therein and co-acting with a nose 84. The bracket 42 is formed with notches 87 in which is mounted a striker plate 88 by way of projections 89 which may rock in the notches in the bracket upon any movement of the plate. The striker plate has extending therefrom a lug 90 to which is connected one end of a helical tension spring 91, the other end of the spring being connected with the bracket 42. The notches 87 and the striker plate projections 89 are so arranged and so co-act that the tension of the spring 91 tends to swing the free end of the striker plate downwardly into contact with the end of the valve 28.

A hand lever 94 (Figs. 7 and 8) is pivoted at 95 in the bracket 42, the one end of the lever extending through the casing wall and the other end of the lever being formed with a finger 96 engageable with the upper surface of the striker plate to tilt the striker plate counter-clockwise about its bearings in the bracket slots to bring the free end of the plate into such position that it may be engaged by the jaw 83 of lever 81 when the auxiliary float 80 is in its lower-most position in the auxiliary float chamber 17. Finger 97 depending from lever 94 extends below and adjacent to striker 88 at the left-hand projection 89 adapted to bear in notch 87. When lever 94 is raised, finger 97 abuts the left-hand projection 89 at 98 to move the projection out of the notch and rotate the striker in a generally horizontal plane about the point of contact between the right-hand projection and its corresponding notch. This crabwise motion causes the striker to disengage the jaws of lever 81 and allows the striker to punch the inlet valve closed. Thus the lever 94 is pushed down to reset the striker and raised to manually release the striker.

In operation, if the inlet valve 28 for any reason sticks in an open position after the outlet valve 61 has been closed to a position which does not pass the amount of oil being admitted in the then position of the inlet valve, the oil level in the main casing chamber 16 arises and oil overflows into the auxiliary casing chamber 17. The auxiliary float 80 is then lifted until the jaw of the auxiliary float lever 81 disengages from the striker plate 88 whereupon the striker plate is quickly rotated by spring 91, in a clockwise direction, to deliver a forcible impact on the inlet valve and drive such vale to its closed position. Thereafter it is necessary to remove the fuel which has accumulated in the auxiliary float chamber so that the auxiliary float may again assume the position shown in Fig. 1, which again brings the auxiliary float lever 81 to the position at which its jaw may engage the end of the striker plate 88. This is accomplished by depressing re-set lever 94 to engage and swing the striker counter-clockwise so the end of the striker pushes nose 84 upwardly to rotate lever 81 about pivot 82. This submerges float 80 and displaces oil from chamber 17. Upon release of the re-set lever the striker will engage jaw 83 which is now in position due to float 80 being in its normal position. Assuming that the cause for sticking of the inlet valve has been removed, the valve may again operate freely and the device is again in condition for normal operation.

Although but one embodiment of the present invention has been illustrated and described, it will be apparent to those skilled in the art that various modifications and changes may be made therein without departing from the spirit of the invention or the scope of the appended claims.

We claim:

1. In a liquid control device, a casing having a guideway formed on an inner surface thereof, a valve seat in the casing adjacent the guideway, a needle valve matched to and cooperating with the seat to meter flow into the casing, a spring biasing the valve toward its open position, a member non-rotatably connected to the valve stem and cooperating with the guide to limit valve rotation with respect to its matched seat, said member having diametrically opposed bosses formed thereon, an equalizing plate supported on said bosses and being tiltable with respect thereto, and float means acting on said plate at points substantially equally spaced between said bosses in response to liquid level in the casing to close the valve in opposition to said spring.

2. In a liquid flow control device comprising, a casing, a valve biased to its open position and adapted to meter flow into the casing, a float responsive to liquid level within the casing to control the position of the valve, a striker mounted in the casing for movement in generally horizontal and vertical planes and operative to punch the valve closed when moved downwardly in a vertical plane, means for retaining the striker in an inoperative position and for automatically releasing the striker to punch the valve when the liquid level exceeds a predetermined maximum, a lever manually movable in a generally vertical plane and acting on the striker to move the striker in the horizontal plane to release the striker from said retaining means and allow the striker to move downwardly to punch the valve when the lever is raised and to move the striker upwardly in the vertical plane to reset the striker in engagement with the retaining means when the lever is depressed.

3. In a liquid flow control device comprising, a casing, a valve biased to its open position and adapted to meter flow into the casing, a float responsive to liquid level within the casing to control the position of the valve, a striker mounted in the casing for movement about generally horizontal and vertical axes and operable to punch the valve closed when moved downwardly about said horizontal axis, means biasing said striker downwardly, means for retaining the striker in an inoperative position and for automatically releasing the striker to punch the valve when the liquid level exceeds a predetermined maximum, a lever manually movable in a generally vertical plane, the lever being engageable with said striker and acting when raised to rotate the striker about said vertical axis until the striker is released from the retaining means and acting when depressed to rotate the striker upwardly about said horizontal axis to reset the striker in engagement with the retaining means.

4. In a liquid flow control device comprising, a casing, a valve biased to its open position and adapted to meter flow into the casing, a float responsive to liquid level within the casing to control the position of the valve, a striker pivotally mounted in fixed notches, means urging the striker into the notches and tending to rotate the striker in a generally vertical plane about the pivot axis determined by the notches to punch the valve closed, means for retaining the striker in an inactive position in opposition to the urging means and for automatically releasing the striker to punch the valve closed when the liquid level exceeds a predetermined maximum, a lever manually movable in a generally vertical plane and engageable with said striker, the lever acting when moved in one direction to rotate the striker in a generally horizontal plane about one of the notched pivots in opposition to the urging means to release the striker from the retaining means and allow the urging means to move the striker to punch the valve, the lever acting when moved in another direction to rotate the striker about said pivot axis for resetting the striker in engagement with the retaining means.

5. In a liquid control device, a casing, a valve seat in the casing, a valve matched to and cooperating with the seat to meter liquid flow, a spring biasing the valve away from the seat, a member connected to the valve stem and having diametrically opposed bosses formed thereon, an equalizing plate supported on said bosses and being tiltable with respect to said member, and float means pivotally mounted in the casing and including means acting on said plate at points equally spaced between said bosses.

6. In a liquid control device, a casing having a guideway formed on an inner surface thereof, a valve seat in the casing adjacent the guideway, a needle valve matched to and cooperating with the seat to meter flow into the casing, a spring biasing the valve toward its open position, a member non-rotatably connected to the valve stem and cooperating with the guide to limit valve rotation with respect to its matched seat, said member having diametrically opposed bosses formed thereon, an equalizing plate supported on said bosses and being tiltable with respect thereto, a lever pivotally mounted in the casing and having a bifurcated end adapted to contact said plate at points substantially equally spaced between said bosses, a float connected to the other end of said lever and acting on said valve through said lever to close the valve in opposition to said spring as the liquid level in the casing increases.

7. In a liquid flow control device comprising, a casing, a valve biased to its open position and adapted to meter flow into the casing, a float responsive to liquid level in the casing to control the position of the valve, a striker mounted in the casing for movement about generally horizontal and vertical axes and adapted to punch said valve closed when moved downwardly about the horizontal axis, means biasing said striker downwardly, means for retaining said striker in an inoperative position and operable to release said striker when the level exceeds a predetermined maximum, a manually operable lever engaging said striker and operable to rotate said striker about said vertical axis to release said striker from said retaining means when the lever is moved in one direction and operable to move said striker about said horizontal axis to re-set the striker in the retaining means when moved in another direction.

8. In a liquid flow control device comprising, a casing, a valve biased to its open position and adapted to meter flow into the casing, a float responsive to liquid level in the casing to control the position of the valve, a striker mounted in the casing for movement about generally horizontal and vertical axes, a spring biasing said striker downwardly about said horizontal axis and about said vertical axis, means limiting striker movement about said vertical axis under influence of said spring, means for retaining said striker in an inoperative position and operative to release said striker for downward movement in response to an excessive liquid level in the casing, said striker being operative to punch said valve closed when moved downwardly by said spring, a lever mounted in the casing and adapted to engage said striker and move the striker upwardly to re-set the striker in said retaining means when the lever is moved in one direction, said lever being movable in another direction to move said striker about said vertical axis in opposition to said spring to move the striker out of engagement with said retaining means.

9. In a liquid flow control device comprising, a casing, a valve biased to its open position and adapted to meter flow into the casing, a float responsive to liquid level in the casing to control the position of the valve, a striker mounted in the casing for movement about generally horizontal and vertical axes and adapted to punch said valve closed when moved downwardly about said horizontal axis, means biasing said striker downwardly and opposing movement about said vertical axis, an overflow chamber in said casing adapted to receive flow when the level in the casing exceeds a predetermined level, an auxiliary float in said chamber, a lever pivotally mounted in the casing and connected to said float for actuation thereby, said float lever including a jaw adapted to normally engage said striker to retain the striker in an inoperative position, raising said float when said chamber receives flow being operative to disengage said jaw from said striker to release said striker to punch the valve, a manually operable lever mounted in the casing and engageable with said striker, movement of said manual lever in one direction being operative to move said striker about said vertical axis and disengage the striker from said jaw to allow the striker to punch said valve, movement of said manual lever in another direction being operative to move said striker upwardly about said horizontal axis to seat said striker in said jaw and to act on said float lever to submerge said auxiliary float and displace liquid from said chamber to thereby return said jaw to its normal position.

10. In a liquid flow control device comprising, a casing, a valve biased to its open position and adapted to meter flow into the casing, a float responsive to liquid level within the casing to control the position of the valve, a striker pivotally mounted in fixed notches, means urging the striker into the notches and tending to rotate the striker in a generally vertical plane about the pivot axis determined by the notches to punch the valve closed, an overflow chamber in said casing adapted to receive flow when the level in the casing exceeds a predetermined level, an auxiliary float in said chamber, a lever pivotally mounted in the casing and connected to said float for actuation thereby, said float lever including a jaw adapted to normally engage said striker to retain the striker in an inoperative position, raising said float when said chamber receives flow being operative to disengage said jaw from said striker to release said striker to punch the valve, a manually operable lever mounted in the casing and adapted to engage and rotate said striker about said pivot axis in opposition to said urging means when moved in one direction and adapted to engage the striker at a point closer to one of the notches than the other to cause the striker to move in a generally horizontal plane about said other notch when moved in another direction, the horizontal movement of the striker being operative to disengage the striker from said jaw, rotational movement of the striker about said pivot axis when said manual lever is moved in said one direction being operative to re-set the striker in said jaw and to act on said float lever to submerge said float and displace liquid from said chamber.

11. In a liquid flow control device comprising, a casing, a valve biased to its open position and adapted to meter flow into the casing, a float responsive to liquid level in the casing to control the position of the valve, a striker pivotally mounted on a pair of fixed notches, a spring biasing the striker into said notches and tending to move the striker downwardly about the pivot axis of said notches to punch the valve closed, said striker being movable in a generally horizontal plane when pivoted about one notch only, said spring acting on said striker in opposition to movement in the horizontal plane, an overflow chamber in said casing adapted to receive flow when the level in the casing exceeds a predetermined level, an auxiliary float in said chamber, a lever pivotally mounted in the casing and connected to said float for actuation thereby, said float lever including a jaw adapted to normally engage said striker to retain the striker in an inoperative position, raising said float when said chamber receives flow being operative to disengage said jaw from said striker to release said striker to punch the valve, a manually operable lever mounted in the casing and engageable with said striker, movement of said manual lever in one direction being operative to move said striker in said horizontal plane about said one notch to disengage said striker from said jaw for downward movement by said spring, movement of said manual lever in another direction being operative to move said striker upwardly about said pivot axis in opposition to said spring to act on said float lever to submerge said auxiliary float and displace liquid from said chamber and to re-set said striker in said jaw.

WILLIAM A. BIERMANN.
JOHN T. DULAK.

REFERENCES CITED

The following references are of record in the file of this patent:

UNITED STATES PATENTS

| Number | Name | Date |
| --- | --- | --- |
| 786,895 | Hawkins | Apr. 11, 1905 |
| 945,569 | Millea | Jan. 4, 1910 |
| 959,784 | McKnight | May 31, 1910 |
| 1,258,790 | Lakios | Mar. 12, 1918 |
| 1,361,878 | Kuehner | Dec. 14, 1920 |
| 2,110,100 | Von Wangenheim | Mar. 1, 1938 |
| 2,111,744 | Bock | Mar. 22, 1938 |
| 2,129,937 | Johnson | Sept. 13, 1938 |
| 2,389,519 | Landon | Nov. 20, 1945 |

FOREIGN PATENTS

| Number | Country | Date |
| --- | --- | --- |
| 451,463 | France | Feb. 13, 1913 |